United States Patent
Dvorkis

(10) Patent No.: US 6,948,662 B2
(45) Date of Patent: Sep. 27, 2005

(54) TWO-DIMENSIONAL OPTICAL CODE SCANNER WITH SCANNING PATTERN HAVING REGION OF GREATER APPARENT BRIGHTNESS FOR ASSISTING ALIGNMENT OF SCANNING PATTERN

(75) Inventor: Paul Dvorkis, E. Setauket, NY (US)

(73) Assignee: Symbol Technologies, Inc., Holtsville, NY (US)

(*) Notice: Subject to any disclaimer, the term of this patent is extended or adjusted under 35 U.S.C. 154(b) by 276 days.

(21) Appl. No.: 09/918,358

(22) Filed: Jul. 30, 2001

(65) Prior Publication Data

US 2002/0030108 A1 Mar. 14, 2002

Related U.S. Application Data

(60) Continuation-in-part of application No. 09/047,011, filed on Mar. 24, 1998, now Pat. No. 6,382,513, which is a continuation-in-part of application No. 08/912,147, filed on Aug. 15, 1997, now Pat. No. 5,859,417, which is a continuation of application No. 08/405,585, filed on Mar. 17, 1995, now abandoned, which is a continuation-in-part of application No. 08/268,982, filed on Jun. 30, 1994, now Pat. No. 5,742,038, which is a continuation-in-part of application No. 08/314,519, filed on Sep. 28, 1994, now Pat. No. 5,506,392, which is a division of application No. 08/109,021, filed on Aug. 19, 1993, now Pat. No. 5,352,922, which is a division of application No. 07/735,573, filed on Jul. 25, 1991, now Pat. No. 5,278,397.

(51) Int. Cl.[7] ................................................ G06K 7/10
(52) U.S. Cl. ............................ 235/462.37; 235/462.01; 235/462.06; 235/462.08; 235/462.21; 235/462.22
(58) Field of Search ...................... 235/462.37, 462.06, 235/462.08, 462.09, 462.2, 462.21, 472.01, 472.03, 462.22, 462.23, 462.24, 462.01

(56) References Cited

U.S. PATENT DOCUMENTS 3,051,051 A 8/1962 Jeffree
3,396,344 A 8/1968 Broom (Continued)

FOREIGN PATENT DOCUMENTS

DE 3602008 7/1987
EP 0 249 713 12/1987

(Continued)

OTHER PUBLICATIONS

Barkan, Automatic I.D. News, "Author Verifies the Key to Bar Coding Success" (Nov. 1988).

(Continued)

*Primary Examiner*—Michael G. Lee
*Assistant Examiner*—Ahshik Kim
(74) *Attorney, Agent, or Firm*—Watts Hoffmann Co., L.P.A.

(57) ABSTRACT

An alignment indication is provided in an optical scanner for reading a two-dimensional optical code by varying the scanning beam to provide a region of apparent greater brightness. In the case of a PDF417 bar code symbol, an elongated brighter region may be oriented so that it is parallel with rows of the PDF417 symbol. The apparent greater brightness may result because of the persistence of the scanning pattern in the user's vision. The region of apparent greater brightness may be achieved by providing a greater density of scan lines in the region. Because of the persistence in the user's vision, multiple scan lines appear simultaneously, and thus a region with a greater density of scan lines appears as a brighter region. The region of apparent greater brightness may also be achieved by providing a differently shaped scanning spot in the region (e.g., a larger, or more elongated spot). Greater scan line density and differently shaped scanning spot may be combined to produce the region of apparent greater brightness.

44 Claims, 4 Drawing Sheets

U.S. PATENT DOCUMENTS

| | | | |
|---|---|---|---|
| 3,780,270 A | 12/1973 | Faulkner et al. | |
| 3,790,756 A | 2/1974 | Graves et al. | |
| 3,871,748 A | 3/1975 | Day | |
| 4,199,816 A | 4/1980 | Humphrey | |
| 4,360,798 A | 11/1982 | Swartz et al. | |
| 4,369,361 A | 1/1983 | Swartz et al. | |
| 4,403,339 A * | 9/1983 | Wevelsiep et al. | 382/289 |
| 4,500,776 A | 2/1985 | Laser | |
| 4,508,686 A | 4/1985 | Shaber et al. | |
| 4,538,895 A | 9/1985 | Higgins et al. | |
| 4,555,164 A | 11/1985 | Feinbloom | |
| 4,560,862 A | 12/1985 | Eastman et al. | |
| 4,570,057 A | 2/1986 | Chadima, Jr. et al. | |
| 4,606,660 A | 8/1986 | Bradshaw et al. | |
| 4,641,018 A | 2/1987 | Mazumder et al. | |
| 4,652,750 A | 3/1987 | Eastman et al. | |
| 4,705,939 A | 11/1987 | Ulinski, Sr. | |
| 4,721,860 A | 1/1988 | Troendle | |
| 4,748,316 A | 5/1988 | Dickson | |
| 4,777,357 A | 10/1988 | Harada et al. | |
| 4,795,281 A | 1/1989 | Ulinski, Sr. et al. | |
| 4,820,911 A | 4/1989 | Arackellian et al. | |
| 4,822,986 A | 4/1989 | Guthmueller et al. | |
| 4,825,048 A | 4/1989 | Altmann et al. | |
| 4,826,269 A | 5/1989 | Streifer et al. | |
| 4,841,129 A | 6/1989 | Tawara et al. | |
| 4,860,226 A | 8/1989 | Martin et al. | |
| 4,894,790 A | 1/1990 | Yotsuya et al. | |
| 4,896,026 A | 1/1990 | Krichever et al. | |
| 4,916,298 A | 4/1990 | Raphael | |
| 4,933,538 A | 6/1990 | Heiman et al. | |
| 4,980,544 A | 12/1990 | Winter | |
| 4,992,649 A | 2/1991 | Mampe et al. | |
| 5,013,895 A | 5/1991 | Iggulden et al. | |
| 5,015,831 A | 5/1991 | Eastman et al. | |
| 5,034,904 A | 7/1991 | Moy | |
| 5,047,617 A | 9/1991 | Shepard et al. | |
| 5,064,258 A | 11/1991 | Inokuchi et al. | |
| 5,067,093 A | 11/1991 | Przybylowicz et al. | |
| 5,073,954 A | 12/1991 | Van Tyne et al. | |
| 5,081,639 A | 1/1992 | Snyder et al. | |
| 5,115,334 A | 5/1992 | Tomita | |
| 5,149,949 A * | 9/1992 | Wike, Jr. | 235/462.38 |
| 5,170,277 A | 12/1992 | Bard et al. | |
| 5,194,720 A | 3/1993 | Reinnagel et al. | |
| 5,200,597 A | 4/1993 | Eastman et al. | |
| 5,200,599 A * | 4/1993 | Krichever et al. | 235/462.38 |
| 5,210,398 A | 5/1993 | Metlitsky | |
| 5,216,232 A * | 6/1993 | Knowles et al. | 235/462.4 |
| 5,218,190 A | 6/1993 | Hardesty et al. | |
| 5,229,591 A | 7/1993 | Heiman et al. | |
| 5,233,170 A | 8/1993 | Metlitsky et al. | |
| 5,235,167 A | 8/1993 | Dvorkis et al. | |
| 5,250,791 A | 10/1993 | Heiman et al. | |
| 5,254,844 A | 10/1993 | Krichever et al. | |
| 5,280,161 A | 1/1994 | Niwa | |
| 5,288,983 A * | 2/1994 | Nakazawa | 235/462.26 |
| 5,291,319 A | 3/1994 | Harris | |
| 5,296,689 A * | 3/1994 | Reddersen et al. | 235/462.21 |
| 5,304,788 A | 4/1994 | Metlitsky et al. | |
| 5,327,451 A | 7/1994 | Walker et al. | |
| 5,332,892 A | 7/1994 | Li et al. | |
| 5,378,883 A * | 1/1995 | Batterman et al. | 235/462.21 |
| 5,420,411 A | 5/1995 | Salatto, Jr. et al. | |
| 5,438,187 A | 8/1995 | Reddersen et al. | |
| 5,440,111 A | 8/1995 | Eastman et al. | |
| 5,500,516 A * | 3/1996 | Durbin | 235/472.01 |
| 5,504,316 A * | 4/1996 | Bridgelall et al. | 235/462.07 |
| 5,534,684 A * | 7/1996 | Danielson | 235/472.02 |
| 5,576,529 A | 11/1996 | Koenck et al. | |
| 5,591,954 A | 1/1997 | Spencer | |
| 5,591,955 A * | 1/1997 | Laser | 235/462.06 |
| 5,635,697 A | 6/1997 | Shellhammer et al. | |
| 5,640,001 A | 6/1997 | Danielson et al. | |
| 5,671,084 A | 9/1997 | Kurtz | |
| 5,693,930 A | 12/1997 | Katoh et al. | |
| 5,742,038 A | 4/1998 | Dvorkis et al. | |
| 5,859,417 A | 1/1999 | Dvorkis et al. | |
| 5,912,452 A * | 6/1999 | Wiklof et al. | 235/472.01 |
| 5,949,056 A * | 9/1999 | White | 235/472.01 |
| 6,033,090 A * | 3/2000 | Seo | 362/252 |
| 6,039,255 A * | 3/2000 | Seo | 235/462.35 |
| 6,220,514 B1 | 4/2001 | Dvorkis et al. | |
| 6,223,988 B1 * | 5/2001 | Batterman et al. | 235/472.01 |
| 6,575,368 B1 * | 6/2003 | Tamburrini et al. | 235/462.25 |

FOREIGN PATENT DOCUMENTS

| | | | |
|---|---|---|---|
| EP | 0 385 478 | 9/1990 | |
| EP | 0 492 065 | 1/1992 | |
| EP | 0 589 361 | 3/1994 | |
| EP | 1014681 A2 * | 6/2000 | H04N/1/047 |
| JP | 55-88172 | 7/1980 | |
| JP | 60-195639 | 3/1984 | |
| JP | 61-120283 | 6/1986 | |
| JP | 1-93871 | 4/1989 | |
| JP | 3-127191 | 5/1991 | |
| JP | 0198175 | 8/1991 | |
| JP | 6-150039 | 5/1994 | |
| WO | 93/18478 | 9/1993 | |
| WO | 94/01835 | 1/1994 | |

OTHER PUBLICATIONS

Grabowski et al., "Code Reading Mechanical Scanning Gun," IBM Technical Disclosure Bulletin, vol. 5, No. 5 (Oct. 1962).

"Quick Check 500" Brochure, Photographic Sciences, 2 pages (1989).

Yamazaki et al., "New Holographic Technology for a Compact POS Scanner," Applied Optics, vol. 29, No. 11 (Apr. 1990).

International Symbology Specification—Maxicode, AIM International, Inc. (May 8, 1997).

* cited by examiner

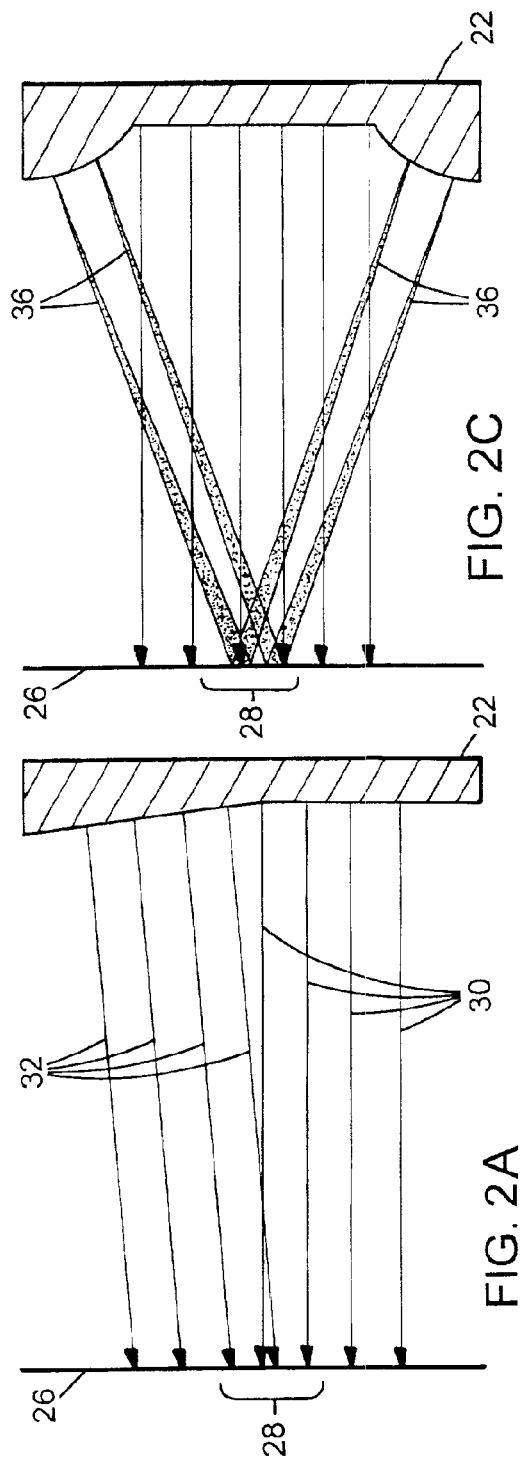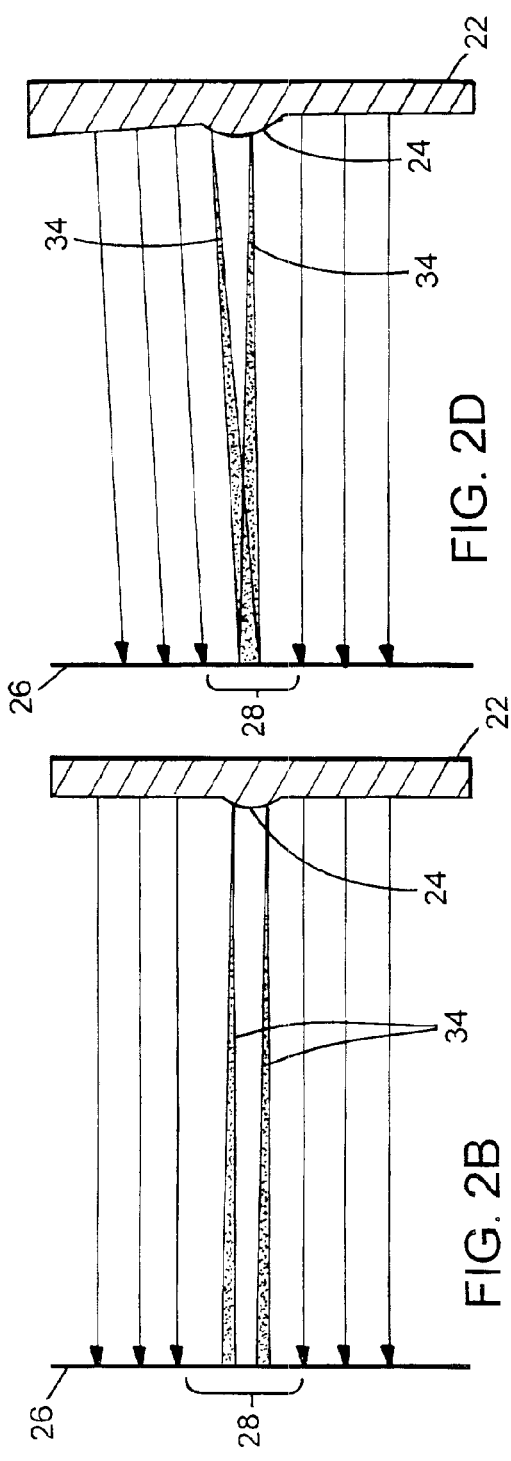

TWO-DIMENSIONAL OPTICAL CODE SCANNER WITH SCANNING PATTERN HAVING REGION OF GREATER APPARENT BRIGHTNESS FOR ASSISTING ALIGNMENT OF SCANNING PATTERN

CROSS REFERENCE TO RELATED APPLICATIONS

This is a continuation-in-part of Ser. No. 09/047,011, filed Mar. 26, 1998, now U.S. Pat. No. 6,382,513 which is a continuation-in-part of Ser. No. 08/912,147, filed Aug. 15, 1997, now issued U.S. Pat. No. 5,859,417, which is a continuation of application Ser. No. 08/405,585, filed Mar. 17, 1995, now abandoned, which is a continuation-in-part of application Ser. No. 08/268,982, filed Jun. 30, 1994, now U.S. Pat. No. 5,742,038, which is a continuation-in-part of application Ser. No. 08/314,519, filed Sep. 28, 1994, now issued U.S. Pat. No. 5,506,392, which is a divisional of application Ser. No. 08/109,021, filed Aug. 19, 1993, now issued U.S. Pat. No. 5,352,922, which is a divisional of application Ser. No. 07/735,573, filed Jul. 25, 1991, now issued U.S. Pat. No. 5,278,397.

BACKGROUND

The invention relates generally to optical scanners, and in particular to scanners used for scanning two-dimensional optical codes such as bar code symbols.

Optical codes are patterns made up of image areas having different light reflective or light emissive properties, which are typically assembled in accordance with a priori rules. The term "bar code symbol" is sometimes used to describe certain kinds of optical codes. The optical properties and patterns of optical codes are selected to distinguish them in appearance from the background environments in which they are used. Devices for identifying or extracting data from optical codes are sometimes referred to as "optical code readers" of which bar code scanners are one type. Optical code readers are used in both fixed or portable installations in many diverse environments such as in stores for check-out services, in manufacturing locations for work flow and inventory control and in transport vehicles for tracking package handling. The optical code can be used as a rapid, generalized means of data entry, for example, by reading a target bar code from a printed listing of many bar codes. In some uses, the optical code reader is connected to a portable data processing device or a data collection and transmission device. Frequently, the optical code reader includes a handheld sensor that is manually directed at a target code.

Generally, it is necessary to align the scanning beam with the optical code in order to read the code. For example, with the common one-dimensional bar code symbol, which has a pattern of variable-width rectangular bars separated by fixed or variable width spaces (with the bars and spaces having different light reflecting characteristics), the scanner is typically aligned so that the scanning beam moves across all or at least a large fraction of the bars and spaces in one pass.

Some optical codes are two-dimensional, such as the well known PDF417 two-dimensional bar code symbol, in which a pattern of light and dark elements are arranged in rows. A description of the PDF417 bar code symbol and techniques for decoding it are disclosed in U.S. Pat. No. 5,635,697 to Shellhammer et al. and assigned to Symbol Technologies, Inc., which patent is incorporated herein by reference. Other two-dimensional optical codes are known (e.g., MaxiCode, described in the publication, "International Symbology Specification—Maxicode", by AIM International, Inc.). Typically, a two dimensional optical code comprises a grid tiled by regular polygons such as squares or hexagons. Typically a black or white feature or polygon is located at each grid location.

Alignment of the scanning beam can be more important in the case of two-dimensional optical codes than with one-dimensional codes. For example, with the PDF417 symbol, the scanning beam typically moves in a raster pattern, in which the beam traces out a series of spaced apart rows that cover a rectangular area (much as the beam of a cathode ray tube moves across the top row, then the second row, and so forth until reaching the bottom row, before starting over again at the top row). It can be desirable for the rows of the raster pattern to be aligned with rows of the two-dimensional bar code.

Sometimes, particularly in the case of handheld bar code readers, it is desirable to give visual clues to the user to facilitate the desired alignment. For example, with a typical one-dimensional bar code reader, the user sees a visible line (typically a red line) corresponding to the path of the scanning beam, and the line is simply aligned with the bar code symbol.

SUMMARY

In general, the invention features providing an alignment indication for an optical scanner reading a two-dimensional optical code by varying the scanning beam to provide a region of apparent greater brightness. Actual brightness of the scanning beam need not vary, so long as to the user's eye there is a region of greater brightness that can be used for alignment. For example, in the case of a PDF417 bar code symbol, an elongated brighter region may be oriented so that it is parallel with rows of the PDF417 symbol.

In preferred implementations of the invention, one or more of the following features may be incorporated.

The apparent greater brightness may result because of the persistence of the scanning pattern in the user's vision.

The region of apparent greater brightness may be achieved by providing a greater density of scan lines in the region. Because of the persistence in the user's vision, multiple scan lines appear simultaneously, and thus a region with a greater density of scan lines appears as a brighter region.

The region of apparent greater brightness may be achieved by providing a differently shaped scanning spot in the region (e.g., a larger, or more elongated spot). Persistence in a user's vision may also account for the larger spot size appearing as a brighter region.

The region of apparent greater brightness may be a region in which the density of scan lines is greater and the scanning spot of the outgoing light beam is shaped differently.

The two-dimensional scanning assembly may produce a plurality of generally spaced apart, parallel scan lines that produce a raster-scanned pattern of scan lines on the indicia, wherein the raster scanning assembly comprises a multi-surface reflector having at least first and second surfaces, the first surface producing first scan lines on the indicia, and the second surface producing second scan lines on the indicia, wherein the first and second surfaces are differently shaped and positioned relative to one another so that first scan lines overlap some of the second scan lines, to produce a region of overlapping scan lines on the indicia, and wherein the region of overlapping scan lines produces the region of apparent greater brightness.

The two-dimensional scanning assembly may produce a plurality of generally spaced apart, parallel scan lines that produce a raster-scanned pattern of scan lines on the indicia, wherein the raster scanning assembly comprises a multi-surface reflector having at least first and second surfaces, the first surface producing first scan lines on the indicia, and the second surface producing second scan lines on the indicia, wherein the first and second surfaces are differently shaped and positioned relative to one another so that the spot of the first scan lines is shaped differently from the spot of the second scan lines, and wherein the difference in spot shape produces the region of apparent greater brightness.

The two-dimensional scanning assembly may produce a plurality of generally spaced apart, parallel scan lines that produce a raster-scanned pattern of scan lines on the indicia, wherein the raster scanning assembly comprises a multi-surface reflector having surfaces on the reflector that are differently shaped and positioned relative to one another so that scan lines overlap other scan lines, to produce a region of overlapping scan lines on the indicia, and so that the scanning spot is shaped differently for at least some of the scan lines in the region of overlapping scan lines, and wherein the overlapping scan lines and the difference in spot shape produce the region of apparent greater brightness.

The difference in spot shape may be an enlargement of the area of the spot at the indicia.

The difference in spot shape may be an elongation of the spot at the indicia.

The optical code may comprise rows of optically coded elements, and wherein the region of apparent greater brightness may be an elongated region that is aligned parallel with the rows of optically coded elements in the optical code.

There may be less bright regions above and below the region of apparent greater brightness.

The first and second surfaces may be inclined relative to one another.

The first and second surfaces may be planar.

At least one of the first and second surfaces may be curved.

The difference in spot shape may be produced by at least one curved projection on the surface of the reflector.

There may be a curved projection at approximately the center of the reflector, and the curved projection may have the effect of producing a centrally located region of apparent greater brightness.

There may be at least two curved projections, one at approximately each end of the reflector surface.

The surfaces on the reflector may include first and second surfaces inclined relative to one another along a boundary, and a third surface may comprise a curved projection located at the boundary.

The reflector may rotate about a first axis to produce movement of the scanning spot along a first direction, and wherein the scanning assembly may include a second reflector that rotates about a second axis to produce movement of the scanning spot in a second direction.

The first and second directions of movement of the scanning spot may be generally orthogonal.

Other features and advantages of the invention will be apparent from the following drawings and detailed description of the invention, and from the claims.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 2A–2D are diagrammatic views of the manner in which a laser beam is reflected from a mirror toward a target in the embodiment of FIG. 1.

DETAILED DESCRIPTION

Figure 1:
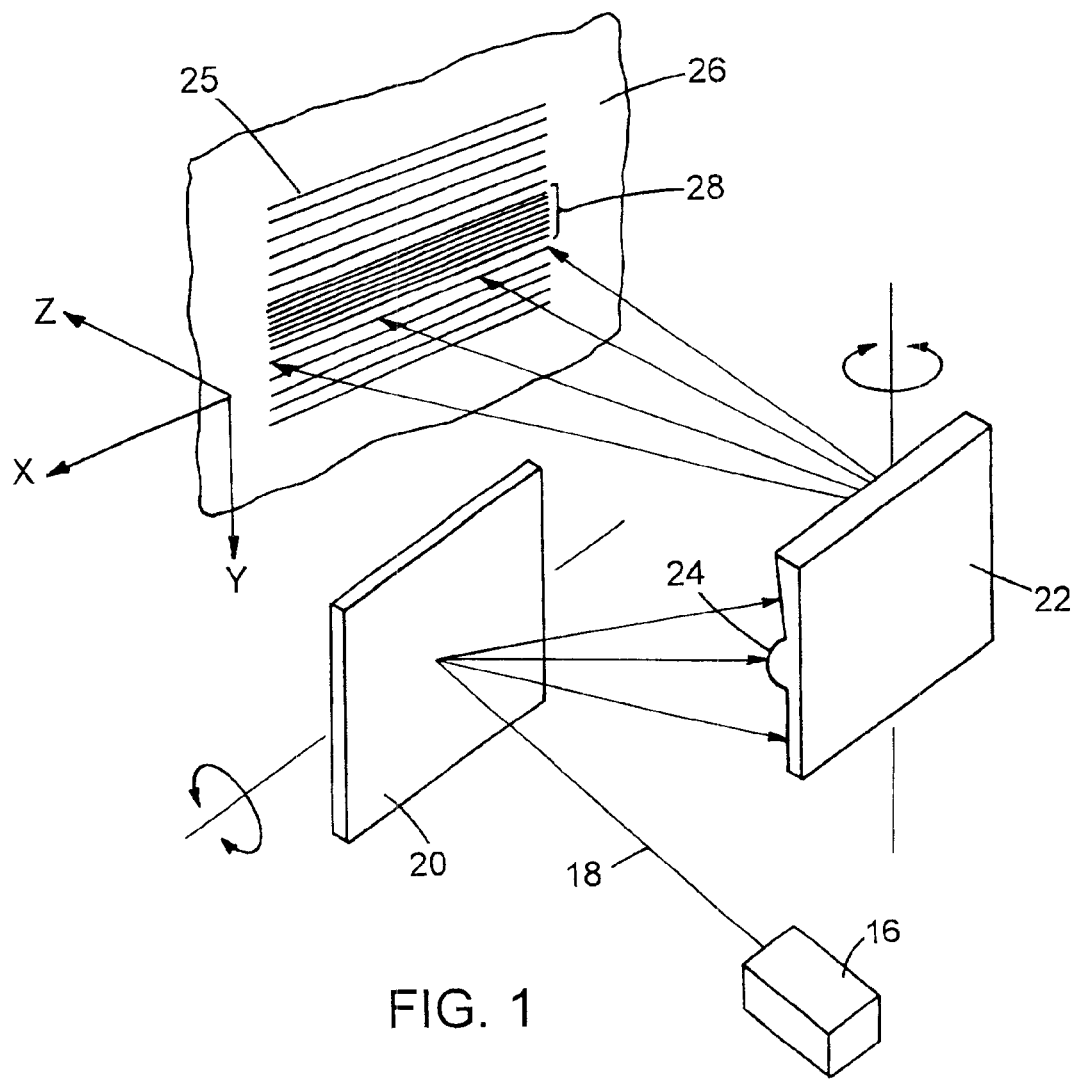
FIG. 1 is an optical schematic of a preferred embodiment of the invention.

A specific embodiment for use with a two-dimensional bar code symbol such as a PDF417 symbol is shown in FIGS. 1–4.

A handheld bar code reader 10 directs a two-dimensionally scanned light beam 12 toward a two-dimensional optical code 14 (e.g., a PDF417 bar code symbol) in a book 16 containing multiple such codes. A region of apparent greater brightness 18 is created as part of the two-dimensional scanning pattern. The region 18 is useful for aligning the scanning pattern with the two-dimensional pattern of the optical code.

Two oscillating mirrors are used to produce a raster scan across a target. Oscillation of the first mirror 20 causes a laser beam 18 (generated by laser source 16) to move up and down across the surface of the second mirror 22. Oscillation of the second mirror causes the beam to move left and right. Together the two oscillating mirrors produce a raster scanned pattern 25 on target 26, typically at a rate of 30–100 lines per second. A variation in the shape of the reflector of the second mirror 22 is what produces the region of increased apparent brightness.

If the two mirrors both had flat surfaces, the raster scanned pattern would be uniform. But mirror 22 is shaped to produce what would appear to the eye to be a brighter central region 28 in the raster pattern. Two different types of mirror shaping are used to produce the brighter central region. First, the upper half of mirror 22 is slightly inclined from the vertical by 1–2 degrees (exaggerated in the drawing). Although this preferred embodiment of the invention uses a flat surface 22, it is within the scope of the invention to use a curved surface. FIG. 2A shows the effect of this inclination. The right to left arrows on the figure diagrammatically represent the laser beam at different vertical positions along the mirror (as caused by oscillations of mirror 20). The first four beams 30 (of course, there will be many more in the raster pattern, but a smaller number are shown in the figure for clarity) emanate from the lower half of the mirror surface and are directed horizontally across to the target 26. The second four beams 32 emanate from the inclined surface of the mirror, and thus are directed at a slightly downward inclination from the horizontal. The result is that the beams emanating from just above the start of the inclination overlap the beams emanating from just below, thereby overlapping some of the beams to produce more beams in the center, and consequently the desired brighter central region 28 of the raster pattern, as it would appear to the eye.

The second type of mirror shaping used on mirror 22 is an elliptical or cylindrical spine along the center line of the mirror. The effect of the spine is shown in FIG. 2B. Reflected beams emanating from the spine are widened in the vertical or "y" direction as a result of the curvature of the spine in the "y" direction. This has the effect of increasing the area of the scanning spot—more specifically, of changing a circular spot to an elliptical spot—on the target in the central region 28, and thus a brightening, to the eye, of the region traversed by the elliptical spot. As discussed in parent application, Ser. No. 08/912,147, this also has the effect of changing the working range of the scanner.

Figure 3:
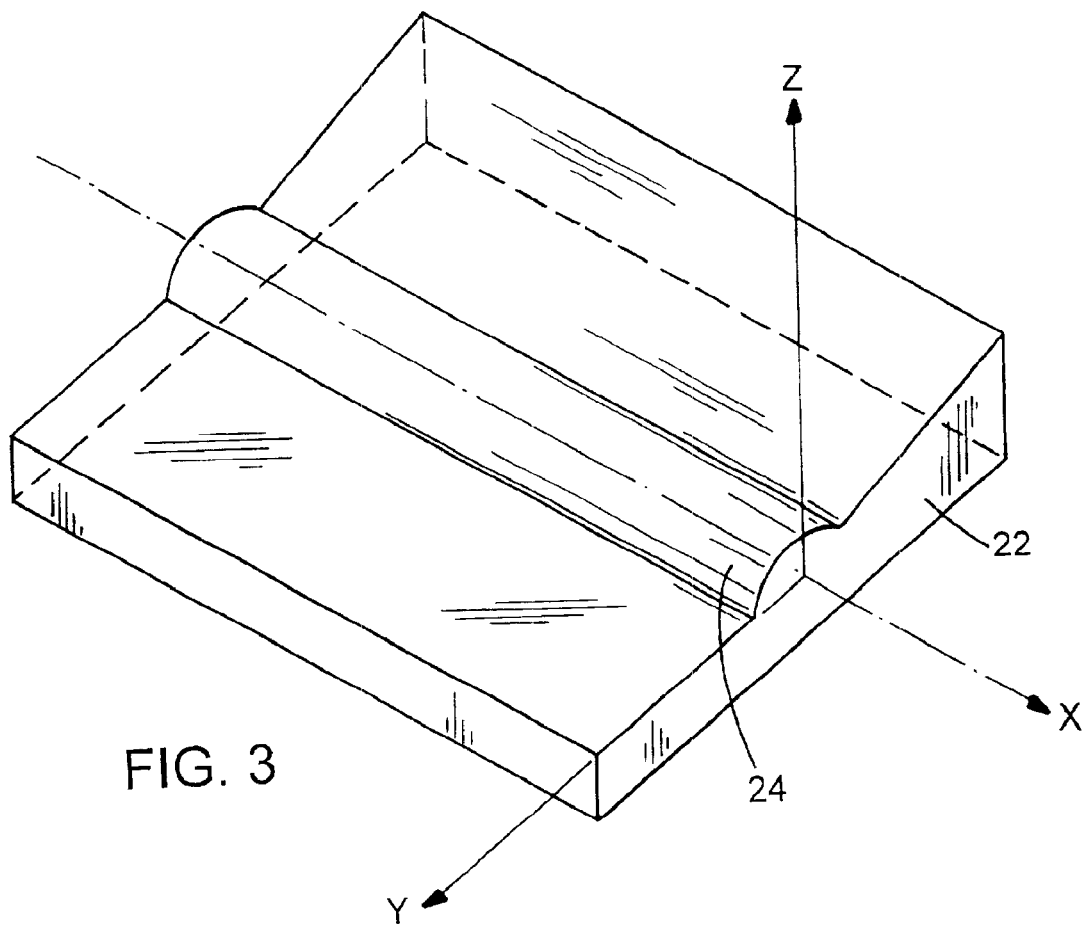
FIG. 3 is a perspective view of the mirror shown in FIG. 2D.
Figure 4:
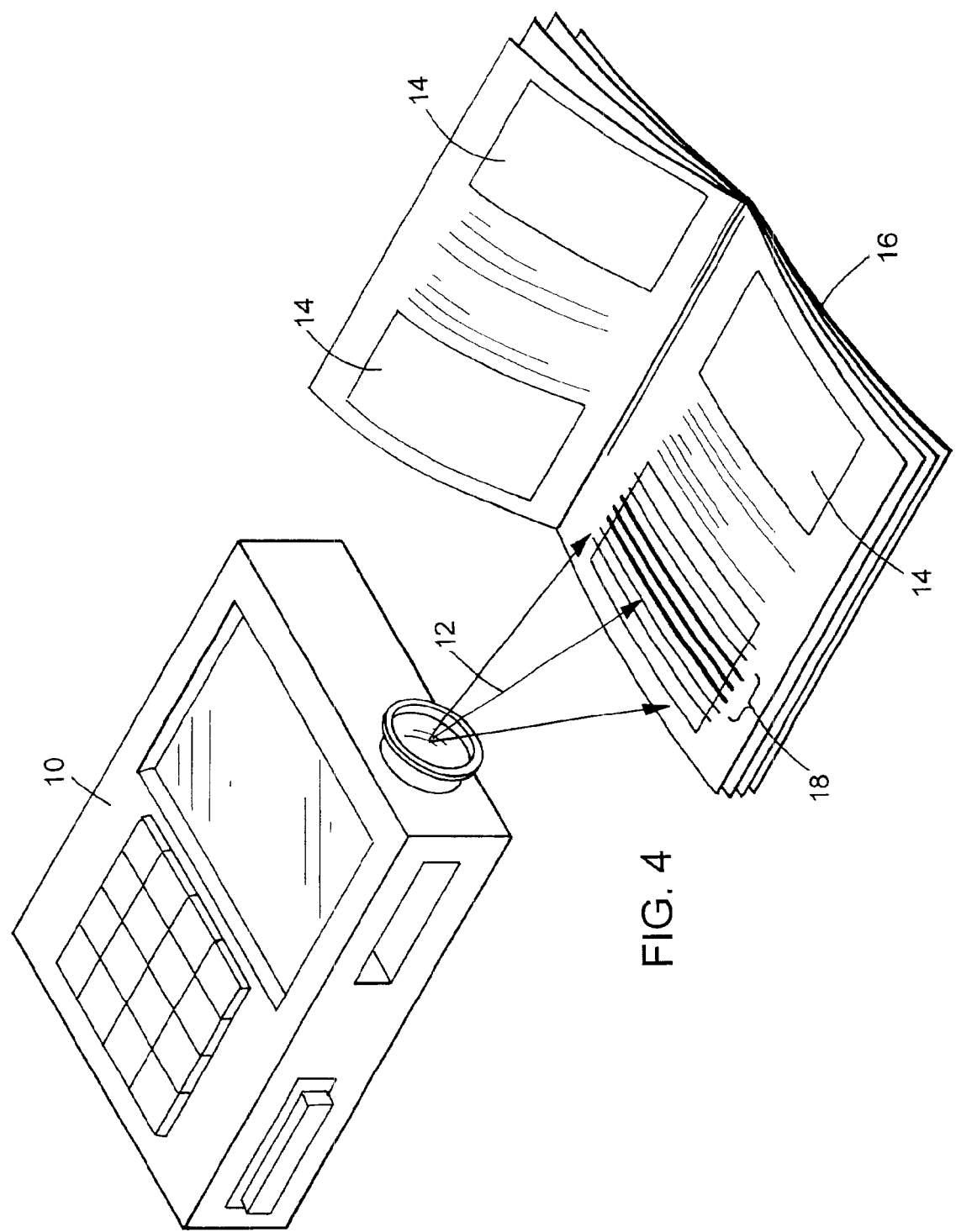
FIG. 4 is a perspective view of the preferred embodiment of the invention in use scanning a two-dimensional bar code.

Both types of mirror shaping are preferably used together, as shown in FIG. 2D and FIG. 3. Widened and overlapping beams land in the central region 28 of the raster pattern.

An alternative mirror shaping is shown in FIG. 2C. Elliptical or cylindrical shapes along inclined surfaces are provided at the top and bottom of the mirror. The inclination of these shapes has the result of directing reflected beams 36 toward the central region. The elliptical or cylindrical curvature of these shapes has the effect of widening beams 36. The net result is the desired brighter central region 28.

FIG. 3 shows the three-dimensional appearance of the mirror of FIG. 1 and FIG. 2D. The inclination of the upper half of the mirror is exaggerated, as is the curvature and height of the elliptical or cylindrical spine 24. For reference purposes an XYZ coordinate system has been placed on mirror 22 in FIG. 3. A corresponding XYZ coordinate system has been shown in FIG. 1 on the target. In FIGS. 2A–2D, there is no coordinate system shown, but the vertical direction in the figures is the Y direction, and the reflected beams are generally in the Z direction.

Other embodiments are within the scope of the following claims. For example, with two-dimensional optical codes in which the elements of varying reflectivity are arranged in patterns other than rows, the region of increased apparent brightness need not be linear as shown in FIG. 1, but could take on a different form suited for aligning the scanning pattern with the pattern of elements of the particular two-dimensional code.

What is claimed is:

1. An optical scanner for reading an optical code having a two-dimensional pattern of different light reflectivity, comprising:
   light source for producing a light beam; and
   a raster scanning assembly for receiving the light beam and producing an outgoing light beam having a two-dimensional scanning pattern,
   the raster scanning assembly comprising optical elements shaped and positioned so that the two-dimensional scanning pattern produces at least one region of apparent greater brightness on the indicia,
   wherein the region of apparent greater brightness has a shape and orientation suitable for assisting in alignment of two-dimensional scanning pattern of the outgoing light beam with the two-dimensional pattern of the optical code.

2. The optical scanner of claim 1 wherein the region of apparent greater brightness is a region in which the density of scan lines in the two-dimensional scanning pattern is greater than in other regions.

3. The optical scanner of claim 1 wherein the region of apparent greater brightness is a region in which the scanning spot of the outgoing light beam is shaped differently from the shape in other regions.

4. The optical scanner of claim 1 wherein the region of apparent greater brightness is a region in which the density of scan lines in the two-dimensional scanning pattern is greater than in other regions and the scanning spot of the outgoing light beam is shaped differently from the shape in other regions.

5. The optical scanner of claim 2 wherein the two-dimensional scanning assembly produces a plurality of generally spaced apart, parallel scan lines that produce a raster-scanned pattern of scan lines on the indicia,
   wherein the raster scanning assembly comprises a multi-surface reflector having at least first and second surfaces, the first surface producing first scan lines on the indicia, and the second surface producing second scan lines on the indicia,
   wherein the first and second surfaces are differently shaped and positioned relative to one another so that first scan lines overlap some of the second scan lines, to produce a region of overlapping scan lines on the indicia, and
   wherein the region of overlapping scan lines produces the region of apparent greater brightness.

6. The optical scanner of claim 3 wherein the two-dimensional scanning assembly produces a plurality of generally spaced apart, parallel scan lines that produce a raster-scanned pattern of scan lines on the indicia,
   wherein the raster scanning assembly comprises a multi-surface reflector having at least first and second surfaces, the first surface producing first scan lines on the indicia, and the second surface producing second scan lines on the indicia,
   wherein first and second surfaces are differently shaped and positioned relative to one another so that the spot of the first scan lines is shaped differently from the spot of the second scan lines, and,
   wherein the difference in spot shaped produces the region of apparent greater brightness.

7. The optical scanner of claim 4 wherein the two-dimensional scanning assembly produces a plurality of generally spaced apart, parallel scan lines that produce a raster-scanned pattern of scan lines on the indicia,
   wherein the raster scanning assembly comprises a multi-surface reflector having surfaces on the reflector that are differently shaped and positioned relative to one another so that scan lines overlap other scan lines, to produce a region of overlapping scan lines on the indicia, and so that the scanning spot is shaped differently for at least some of the scan lines in the region of overlapping scan lines, and
   wherein the overlapping scan lines and the difference in spot shape produce the region of apparent greater brightness.

8. The optical scanner of claim 3, 4, 6, or 7 wherein the different in spot shape is an enlargement of the area of the spot at the indicia.

9. The optical scanner of claim 3, 4, 6, or 7 wherein the different in spot shape is an elongation of the spot at the indicia.

10. The optical scanner of claim 1, 5, 6 or 7 wherein the optical code comprises rows of optically coded elements, and wherein the region of apparent greater brightness is an elongated region that is aligned parallel with the rows of optically coded elements in the optical code.

11. The optical scanner of claim 10 wherein there are less bright regions above and below the region of apparent greater brightness.

12. The optical scanner of claim 5 wherein the first and second surfaces are inclined relative to one another.

13. The optical scanner of claim 12 wherein the first and second surfaces are planar.

14. The optical scanner of claim 12 wherein at least one of the first and second surfaces is curved.

15. The optical scanner of claim 6 or 7 wherein the difference in spot shape is produced by at least one curved projection on the surface of the reflector.

16. The optical scanner of claim 15 wherein there is a curved projection at approximately the center of the reflector, and the curved projection has the effect of producing a centrally located region of apparent greater brightness.

17. The optical scanner of claim 15 wherein there are at least two curved projections, one at approximately each end of the reflector surface.

18. The optical scanner of claim 7 wherein the surfaces on the reflector include first and second surfaces inclined relative to one another along a boundary, and a third surface comprising a curved projection located at the boundary.

19. The optical scanner of claim 5, 6 or 7 wherein the reflector rotates about a first axis to produce movement of the scanning spot along a first direction, and wherein the scanning assembly includes a second reflector that rotates about a second axis to produce movement of the scanning spot in a second direction.

20. The optical scanner of claim 19 wherein the first and second directions of movement of the scanning spot are generally orthogonal.

21. The optical scanner of claim 8 wherein the difference in the spot shape is produced by at least one curved projection on the surface of the reflector.

22. The optical scanner of claim 9 wherein the difference in spot shape is produced by at least one curved projection on the surface of the refectory.

23. An optical scanner for reading an optical code having a two-dimensional pattern of different light reflectivity, comprising:
light source for producing a light beam; and
a raster scanning assembly for receiving the light beam and producing an outgoing light beam having a two-dimensional scanning pattern,
the raster scanning assembly comprising optical elements shaped and positioned to produce a two-dimensional scanning pattern having at least one region of apparent greater brightness generally centralized within the scanning pattern when projected onto an indicia,
wherein the region of apparent greater brightness has a shape and orientation suitable for assisting in alignment of two-dimensional scanning pattern of the outgoing light beam with the two-dimensional pattern of the optical code.

24. An optical scanner for reading an optical code having a two-dimensional pattern of different light reflectivity, comprising:
light source for producing a light beam; and
a raster scanning assembly for receiving the light beam and producing an outgoing light beam having a two-dimensional scanning pattern,
the raster scanning assembly comprising optical elements shaped and positioned so that the two-dimensional scanning pattern produces at least one region of apparent greater brightness on the indicia wherein the region of apparent greater brightness is a region in which the scanning spot of the outgoing light beam is shaped differently from the shape in other regions,
wherein the region of apparent greater brightness has a shape and orientation suitable for assisting in alignment of two-dimensional scanning pattern of the outgoing light beam with the two-dimensional pattern of the optical code.

25. The optical scanner of claim 24 wherein there are less bright regions above and below the region of apparent greater brightness.

26. The optical scanner of claim 24 wherein the region of apparent greater brightness is a region in which the scanning spot of the outgoing light beam is shaped differently from the shape in other regions.

27. The optical scanner of claim 24 wherein the region of apparent greater brightness is a region in which the density of scan lines in the two-dimensional scanning pattern is greater than in other regions and the scanning spot of the outgoing light beam is shaped differently from the shape in other regions.

28. The optical scanner of claim 24 wherein the two-dimensional scanning assembly produces a plurality of generally spaced apart, parallel scan lines that produce a raster-scanned pattern of scan lines on the indicia,
wherein the raster scanning assembly comprises a multi-surface reflector having at least first and second surfaces, the first surface producing first scan lines on the indicia, and the second surface producing second scan lines on the indicia,
wherein the first and second surfaces are differently shaped and positioned relative to one another so that first scan lines overlap some of the second scan lines, to produce a region of overlapping scan lines on the indicia, and
wherein the region of overlapping scan lines produces the region of apparent greater brightness.

29. The optical scanner of claim 26 wherein the two-dimensional scanning assembly produces a plurality of generally spaced apart, parallel scan lines that produce a raster-scanned pattern of scan lines on the indicia,
wherein the raster scanning assembly comprises a multi-surface reflector having at least first and second surfaces, the first surface producing first scan lines on the indicia, and the second surface producing second scan lines on the indica,
wherein first and second surfaces are differently shaped and positioned relative to one another so that the spot of the first scan lines is shaped differently from the spot of the second scan lines, and,
wherein the difference in spot shaped produces the region of apparent greater brightness.

30. The optical scanner of claim 27 wherein the two-dimensional scanning assembly produces a plurality of generally spaced apart, parallel scan lines that produce a raster-scanned pattern of scan lines on the indicia,
wherein the raster scanning assembly comprises a multi-surface reflector having surfaces on the reflector that are differently shaped and positioned relative to one another so that scan lines overlap other scan lines, to produce a region of overlapping scan lines on the indicia, and so that the scanning spot is shaped differently for at least some of the scan lines in the region of overlapping scan lines, and
wherein the overlapping scan lines and the difference in spot shape produce the region of apparent greater brightness.

31. The optical scanner of claim 26 wherein the different in spot shape is an enlargement of the area of the spot at the indicia.

32. The optical scanner of claim 26 wherein the different in spot shape is an elongation of the spot at the indicia.

33. The optical scanner of claim 24 wherein the optical code comprises rows of optically coded elements, and wherein the region of apparent greater brightness is an elongated region that is aligned parallel with the rows of optically coded elements in the optical code.

34. The optical scanner of claim 28 wherein the first and second surfaces are inclined relative to one another.

35. The optical scanner of claim 34 wherein the first and second surfaces are planar.

36. The optical scanner of claim 34 wherein at least one of the first and second surfaces is curved.

37. The optical scanner of claim 29 wherein the difference in spot shape is produced by at least one curved projection on the surface of the reflector.

38. The optical scanner of claim 37 wherein there is a curved projection at approximately the center of the reflector, and the curved projection has the effect of producing a centrally located region of apparent greater brightness.

39. The optical scanner of claim 37 wherein there are at least two curved projections, one at approximately each end of the reflector surface.

40. The optical scanner of claim 30 wherein the surfaces on the reflector include first and second surfaces inclined relative to one another along a boundary, and a third surface comprising a curved projection located at the boundary.

41. The optical scanner of claim 28 wherein the reflector rotates about a first axis to produce movement of the scanning spot along a first direction, and wherein the scanning assembly includes a second reflector that rotates about a second axis to produce movement of the scanning spot in a second direction.

42. The optical scanner of claim 41 wherein the first and second directions of movement of the scanning spot are generally orthogonal.

43. The optical scanner of claim 31 wherein the difference in the spot shape is produced by at least one curved projection on the surface of the reflector.

44. The optical scanner of claim 32 wherein the difference in spot shape is produced by at least one curved projection on the surface of the refectory.

* * * * *